United States Patent
Gagliardo et al.

[11] Patent Number: 6,071,021
[45] Date of Patent: Jun. 6, 2000

[54] APPARATUS FOR PROCESSING AND DIGITIZING A RADIOGRAPHIC FILM

[75] Inventors: Andrea Gagliardo, Cosseria; Paolo Ferraris, Albissola Superiore; Bernardo Cerisola, Savona, all of Italy

[73] Assignee: Eastman Kodak Company, Rochester, N.Y.

[21] Appl. No.: 09/192,885

[22] Filed: Nov. 16, 1998

[30] Foreign Application Priority Data

Nov. 26, 1997 [EP] European Pat. Off. .............. 97120678

[51] Int. Cl.⁷ .............................. G03D 3/08; G03D 27/32
[52] U.S. Cl. .............................. 396/612; 355/18; 355/27; 358/487
[58] Field of Search ..................... 396/564, 570, 396/612, 624, 639; 355/27; 358/487, 506, 302

[56] References Cited

U.S. PATENT DOCUMENTS

| | | | |
|---|---|---|---|
| 3,620,725 | 11/1971 | Kosta | 396/622 |
| 4,760,641 | 8/1988 | Gandolfo . | |
| 4,906,847 | 3/1990 | Nakajima et al. | 250/584 |
| 5,003,335 | 3/1991 | Muller et al. | 396/622 |
| 5,237,358 | 8/1993 | Yamada et al. . | |
| 5,432,580 | 7/1995 | Tokuda | 396/570 |
| 5,583,663 | 12/1996 | Boeve . | |

FOREIGN PATENT DOCUMENTS

| | | |
|---|---|---|
| 0 278 238 A1 | 8/1988 | European Pat. Off. . |
| 0 452 570 A1 | 10/1991 | European Pat. Off. . |
| 0 583 823 A1 | 2/1994 | European Pat. Off. . |

*Primary Examiner*—Alan A. Mathews
*Attorney, Agent, or Firm*—William F. Noval

[57] ABSTRACT

The present invention relates to an apparatus for developing and digitizing an image-wise exposed silver halide radiographic film comprising: an automatic radiographic film processing unit having an output, wherein the processing unit develops the image-wise exposed silver halide radiographic film to create a visible image on the radiographic film; a radiographic film digitizer having an input, wherein the radiographic film digitizer is vertically positioned in relation to a lateral side of the radiographic film processing unit, and photoelectrically reads the visible image on the radiographic film; and an integrated docking unit having a connecting means which connects the radiographic film processing unit to the film digitizer and transports the radiographic film from the output of the radiographic film processing unit to the radiographic film digitizer. A method for the automatic processing and digitizing of an image-wise exposed radiographic film is also described.

16 Claims, 6 Drawing Sheets

APPARATUS FOR PROCESSING AND DIGITIZING A RADIOGRAPHIC FILM

FIELD OF THE INVENTION

The present invention relates to an apparatus for processing and digitizing a silver halide photographic material. In particular, the present invention relates to an apparatus for processing and digitizing a medical radiographic film.

BACKGROUND OF THE INVENTION

In clinical or private radiology departments, patients are examined by means of non-invasive techniques, such as X-ray imaging, computed tomography, magnetic resonance, ultrasound, etc.

The use of X-ray imaging in medical diagnosis is presently widespread. According to conventional techniques, an image is recorded by a radiographic film sandwiched between a pair of intensifying screens in a cassette. After exposure, the radiographic film is taken out from the cassette manually or the cassette containing the film is loaded in full daylight in a film handling and processing apparatus such as the Trimatic™ Automatic Processor, manufactured by Imation Corp. USA.

These films are very useful for the radiologists to examine the anatomy in detail. The same films can also be transported to other departments and other physicians. The films can be stored for years and retrieved whenever necessary for comparison with the current situation.

Problems arise when the same images must be available at two different locations at the same time for examination, or when the locations are so distant that the transport time becomes critical. The storage organization and storage area also pose a problem in some hospitals, where by preference the patient carries the films home to keep them. Typically, these films are even more difficult to retrieve, because the patient may have lost them. These problems can be solved by scanning and digitizing the films used for visual examination, directly as they are produced (developed and dry) or before they leave the radiology department, to produce an electronic image from the films. These electronic images can be stored by electronic means in digital format. Today, image processing can be performed on images in digital format, e.g., for semi-automatic comparison of older medical images on film with currently acquired data, the images of the older films must be made available in digital format as electronic images.

During recent years, various manufacturers of radiographic and photographic equipment have offered apparatus useful for the digitization of photographic images. Once the radiographic image is available in digitized form, such a document can be archived, retrieved and processed in any of the various ways offered by digital image processing apparatus, such as, for example, transmission over telephone line for real time, on-line conference or long-distance diagnosis. For this purpose, the film, which has been fed out of the developing machine, must be manually set at the predetermined position in the film digitizer. The main problem of this procedure consists in time and labor consumption required to carry out such manual operations. Also, when the film is processed manually, the film will be contaminated with finger marks, dust, or the like. Therefore, when an image signal is detected from the film and used during the reproduction of a visible radiation image, the image quality of the visible radiation image thus reproduced cannot be kept high.

U.S. Pat. No. 5,237,358 and EP 452,570 attempt to solve the above problem by disclosing a radiation image read-out apparatus comprising an automatic developing machine for carrying out a developing process on an image-wised silver halide film directly connected to a film digitizer such that it may directly receive the silver halide film having been fed out of the automatic developing machine. The film digitizer photoelectrically reads out the radiation image, which has been converted into a visible image during the developing process, from the silver halide film and thereby generates an image signal representing the radiation image.

The main problem arising with the use of the apparatus described above relates to the orientation of the radiographic film entering the digitizing apparatus. Errors in digitization can arise if the film is not correctly fed to the digitizer, that is, if the axis of the film is not exactly aligned with the longitudinal axis of the scanning device. Another problem relates to the dimension of the film. Most common radiographic film formats which are present on the market have widths from about 15 to about 35 centimeters and lengths from about 17 to about 43 centimeters. The automatic developers currently on the market are fed using the longest side as the leading edge. Thus, when using the apparatus described in the above mentioned patents, a scanning line length of about 43 cm is needed in order to have a digitizer able to operate with all radiographic film formats. This increases the difficulties of the scanning apparatus to provide a final electronic image with high resolution. Line scanning is performed by means of a sequence of pixels. The longer the line to be scanned, the more difficult it is to assure the correct orientation of the film with respect of the scanning line. Additionally, the number of pixels required for the scanning line increase with its length and this results in more expensive digitizing apparatus. A third problem relates to the synchronization of the radiographic film processor and digitizer speed. Usually, the speed of radiographic film processor is higher than the speed of the digitizer and this results in a reduction of productivity in the medical department.

U.S. Pat. No. 5,583,663 discloses a digitizer which attempts to solve the above mentioned problems by providing within the digitizer means for keeping the radiographic film in a vertical position on a horizontal plane while a carrier abuts against the rear edge of the film, thereby moving it forward the digitizing means. The digitizer can be associated to a film processor for receiving directly the processed film from the output of the processor or through a film feeder. The solution proposed by such a disclosure requires to put the digitizer in front of the processor, so increasing the working space required by the combination. Additionally, the structure of the digitizer is such that the digitizer dimensions are higher than conventionally available digitizer. Moreover, the absence of any means for keeping the film in a vertical position before entering the scanning line can easily promote the blending or skewing of the film, in particular for high dimension films, with a consequent jam of the system and damage to the film.

Accordingly, there is still a need for working method and a compact dedicated apparatus for easy, convenient and fully automated processing and digitizing of radiographic films which solves the above mentioned problems.

SUMMARY OF THE INVENTION

The present invention relates to an apparatus for developing and digitizing an image-wise exposed silver halide radiographic film comprising:

an automatic radiographic film processing unit having an output, wherein the processing unit develops the image-wise exposed silver halide radiographic film to create a visible image on the radiographic film;

a radiographic film digitizer having an input, wherein said radiographic film digitizer is vertically positioned in relation to a lateral side of said radiographic film processing unit, and photoelectrically reads said visible image on said radiographic film; and an integrated docking unit having a connecting means which connects the radiographic film processing unit to the film digitizer and transports the radiographic film from the output of the radiographic film processing unit to the radiographic film digitizer.

The present invention also relates to a method for the automatic processing and digitizing of an image-wise exposed radiographic film comprising the step of:

processing the radiographic film in an automatic developing apparatus, the processing comprising the steps of developing, fixing, washing and drying, and feeding along a direction (X) the processed radiographic film to a docking unit comprising means for keeping and transporting the processed radiographic film in a position substantially vertical, transporting the processed radiographic film into a radiographic film digitizer, along a direction (Y) substantially orthogonal to the feeding direction (X), and digitizing the processed radiographic film.

DETAILED DESCRIPTION OF THE INVENTION

The present invention is described below in further detail with reference to the accompanying drawings.

Figure 1:
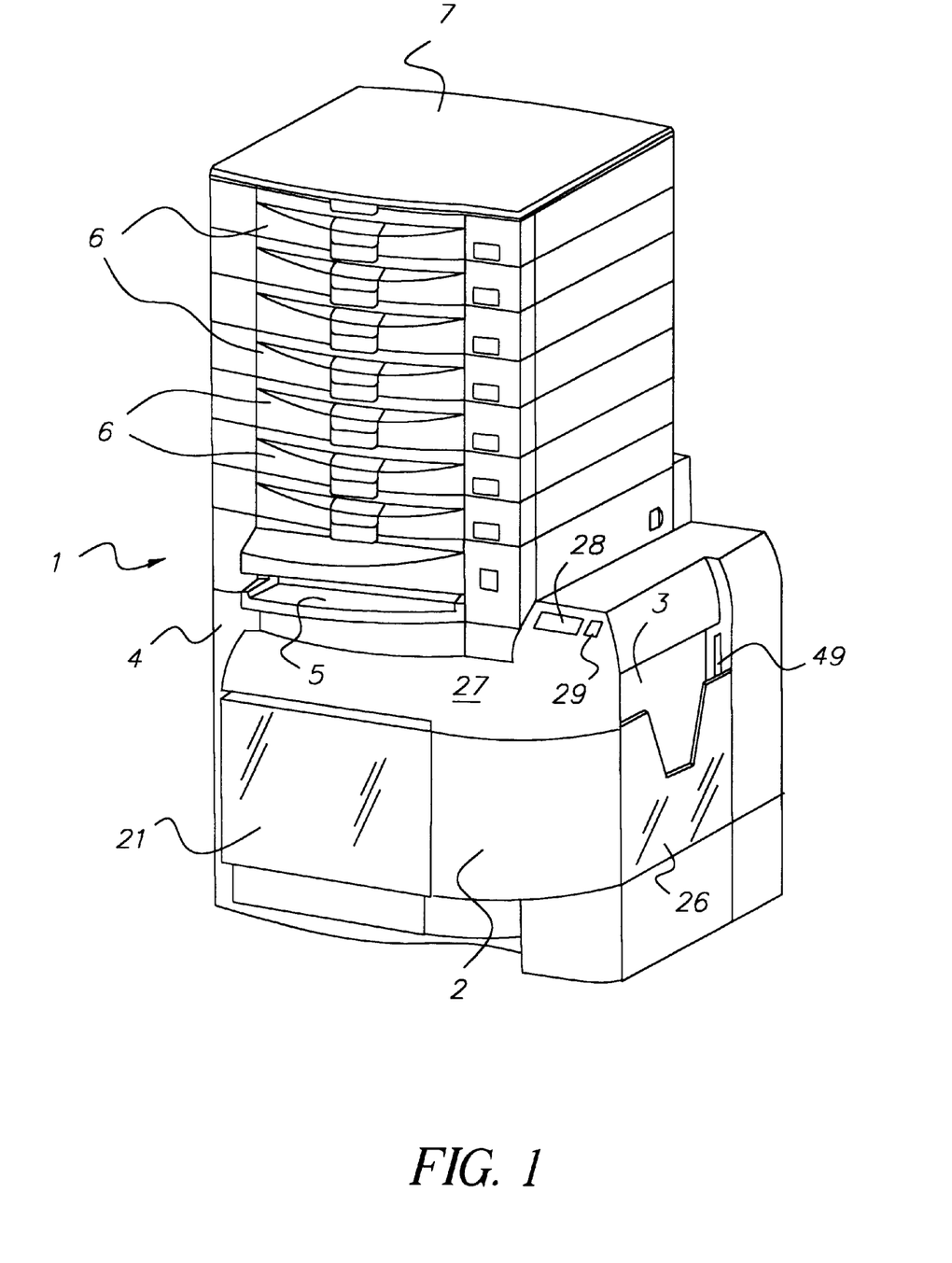
FIG. 1 is a perspective view of the integrated radiographic film processor and digitizer of the present invention.

FIG. 1 is a perspective view showing an embodiment of the integrated radiographic film processor and digitizer of the present invention.

The integrated apparatus 1 comprises a radiographic film processing unit, a docking unit 2 and a radiographic film digitizer 3.

With reference to FIG. 1, the radiographic film processing unit comprises a parallelepiped-shaped ground unit 4, wherein the image-wise exposed radiographic film is processed (i.e., developed, fixed, washed and dried), a cassette-carrying unit 5 secured at the top of the ground unit 4, wherein a radiographic cassette is inserted for the loading/unloading of the radiographic film, a set of magazine-carrying units 6 (in the illustrated example seven magazine carrying-units) placed one on the other above the cassette carrying unit 5, from which radiographic films are taken to load the radiographic film into the radiographic cassette inserted in the unit 5, and a top protecting unit 7 placed on the upper magazine-carrying unit 6. Such a radiographic film processing unit can be a conventional Trimatic™ Automatic Developer or Trimatic™ APS manufactured by Imation Corp. A detailed description of the radiographic film processing unit is disclosed in EP 236,975 incorporated herein by reference. A basket 21 is provided in front of the docking unit 2 and a film receiver 26 is provided at the output of the film digitizer 3.

The docking unit 2 is put in front of the parallelepiped-shaped ground unit 4 of the radiographic film processing unit and its lateral side partially covers the lateral side of the parallelepiped-shaped ground unit 4. The docking unit 2 comprises connecting means for transporting the radiographic film from the output of the radiographic film processing unit to the input of the radiographic film digitizer. The connecting means comprise receiving means for receiving the radiographic film coming from the output of the radiographic film processing unit, keeping means for keeping the radiographic film in a substantially vertical position, and transporting means for transporting the radiographic film from the receiving means to the input of the radiographic film digitizer 3. The docking unit 2 also includes a control panel 27 comprising a display 28 and a set of operating buttons 29. The receiving, keeping and transporting means is described in detail with reference to FIGS. 2 to 4.

Figure 2:
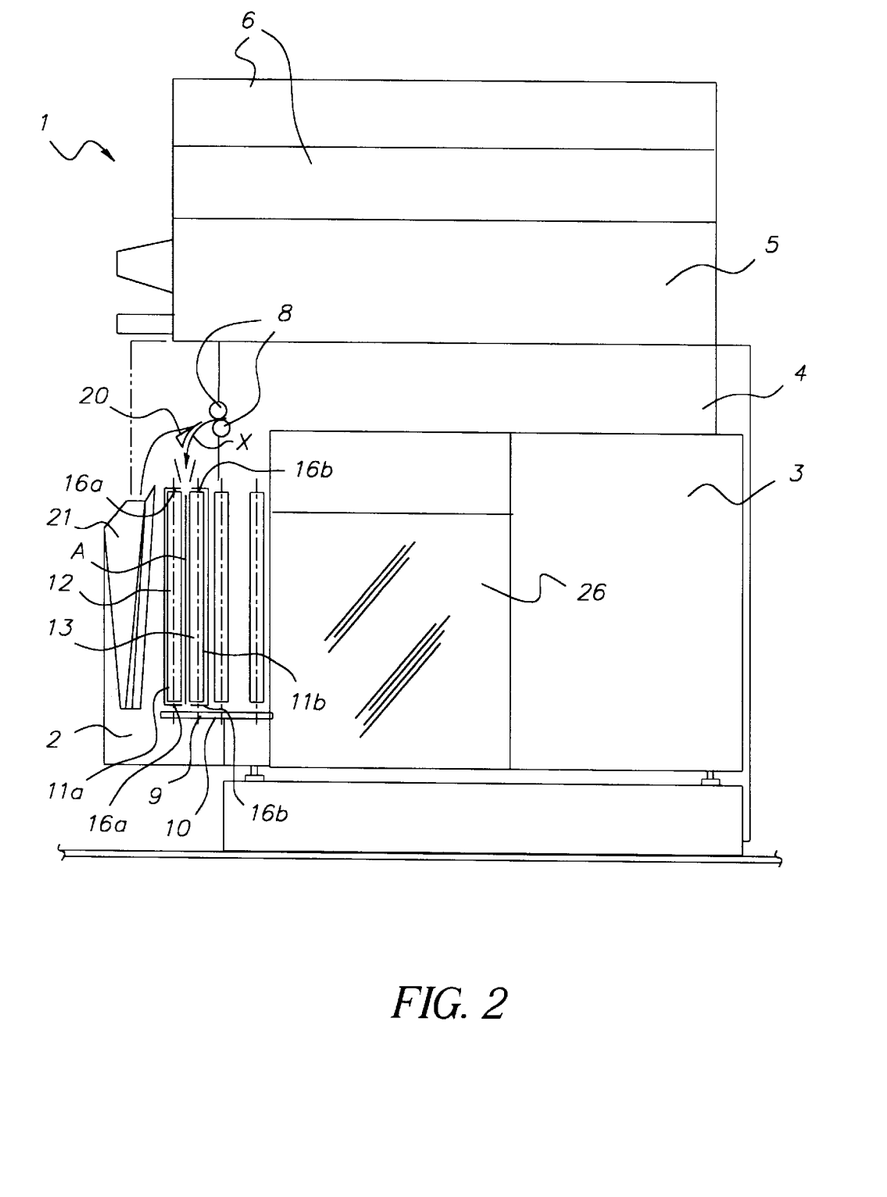
FIG. 2 is a schematic side view of the integrated radiographic film processor and digitizer of the present invention.
Figure 3A:
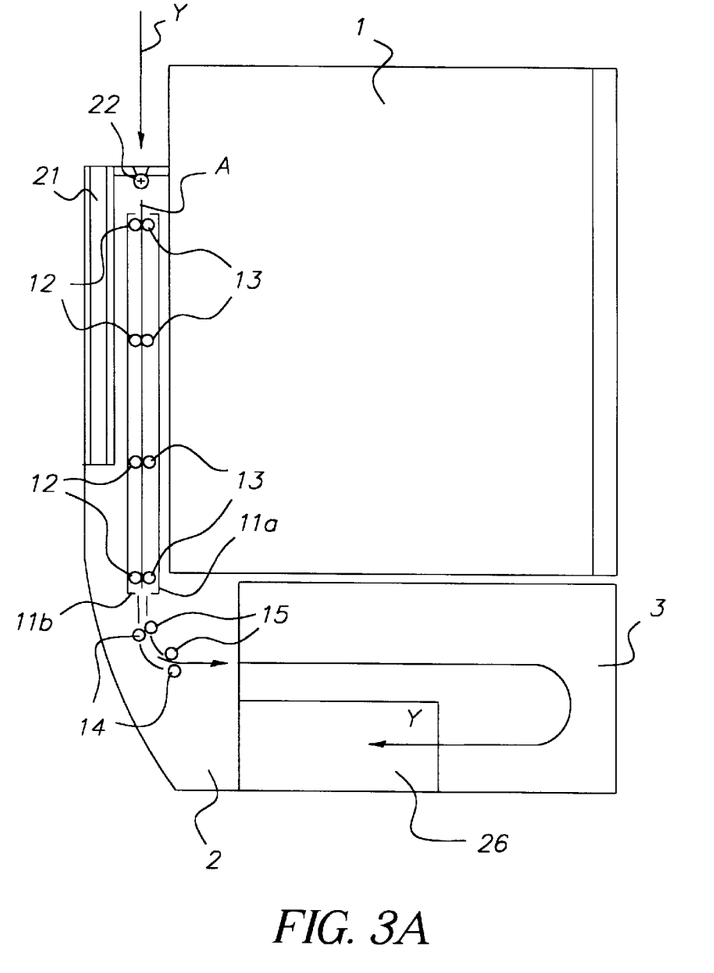
FIG. 3A is a schematic top view of the integrated radiographic film processor and digitizer of the present invention.
Figure 3B:
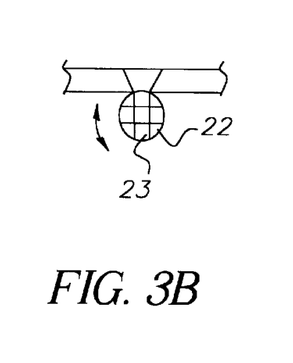
FIG. 3B is a top-view enlargement of the roller for manual feeding.
Figure 3C:
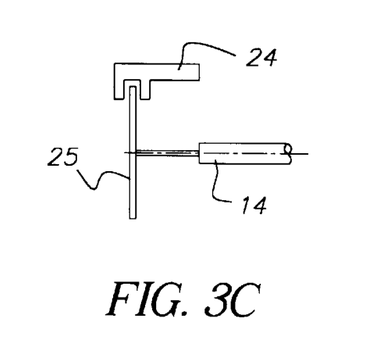
FIG. 3C is a side-view enlargement of the tachometric system.
Figure 4:
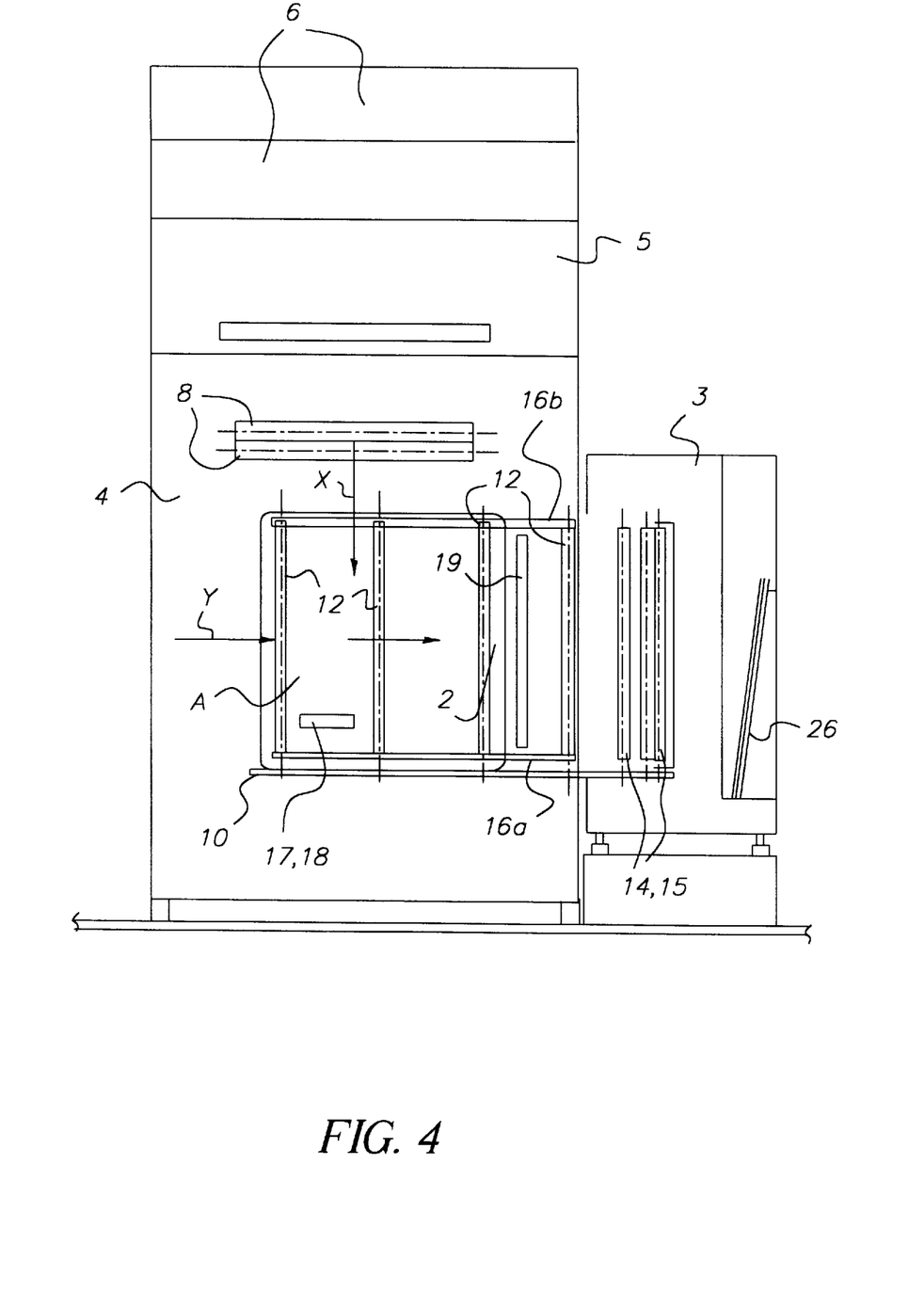
FIG. 4 is a schematic front view of the integrated radiographic film processor and digitizer of the present invention.

With reference to FIGS. 2 to 4, the roller pair 8 represents the output of parallelepiped-shaped ground unit 4. The receiving means comprise a rack 9 consisting of a bottom plane 10 and two front and back sides 11 a and 11 b. The bottom plane 10 of the rack is substantially parallel to the ground. The keeping and transporting means comprise a set of front and back vertical rollers 12 and 13 within the rack 9 and another set of front and back vertical rollers 14 and 15 disposed laterally to the rack 9 along a path leading to the input of the digitizer 3. The front and back vertical rollers 14 and 15 are preferably in a staggered configuration. The front and back vertical rollers 12 and 13 are engaged with the upper and lower edge 16a and 16b of the two front and back sides 11a and 11b, respectively. The front side 11a is fixed, while the back side 11b is movable. With reference to FIG. 4, a pair of positioning infrared sensors 17 and 18 are horizontally positioned in relation to the bottom plane 10. Alternatively, the sensors 17 and 18 can be replaced by a plurality of horizontally-disposed infrared sensors. A plurality of vertically-disposed infrared sensors 19 is put laterally to the rack 9 in relation to the first vertical roller 15. With reference to FIG. 2, a switch 20 is provided for deviating the path of the radiographic film exiting from the output of parallelepiped-shaped ground unit 4 to a basket 21 when the radiographic film need not to be digitized. With reference to FIG. 3B, a roller 22 provided with a groove 23 is provided laterally to the docking unit 2 for the manual insertion of a radiographic film. Roller 22 is actuated by an external command which selects the manual insertion of the film by rotating the roller 22 of 90°, so that the groove 23 is parallel to the inserting direction. A photo-barrier tachometer sensor 24, illustrated in FIG. 3C, is put in relation to a tachometer wheel 25 connected to and rotating with one of the rollers 14 and 15.

Figure 5:
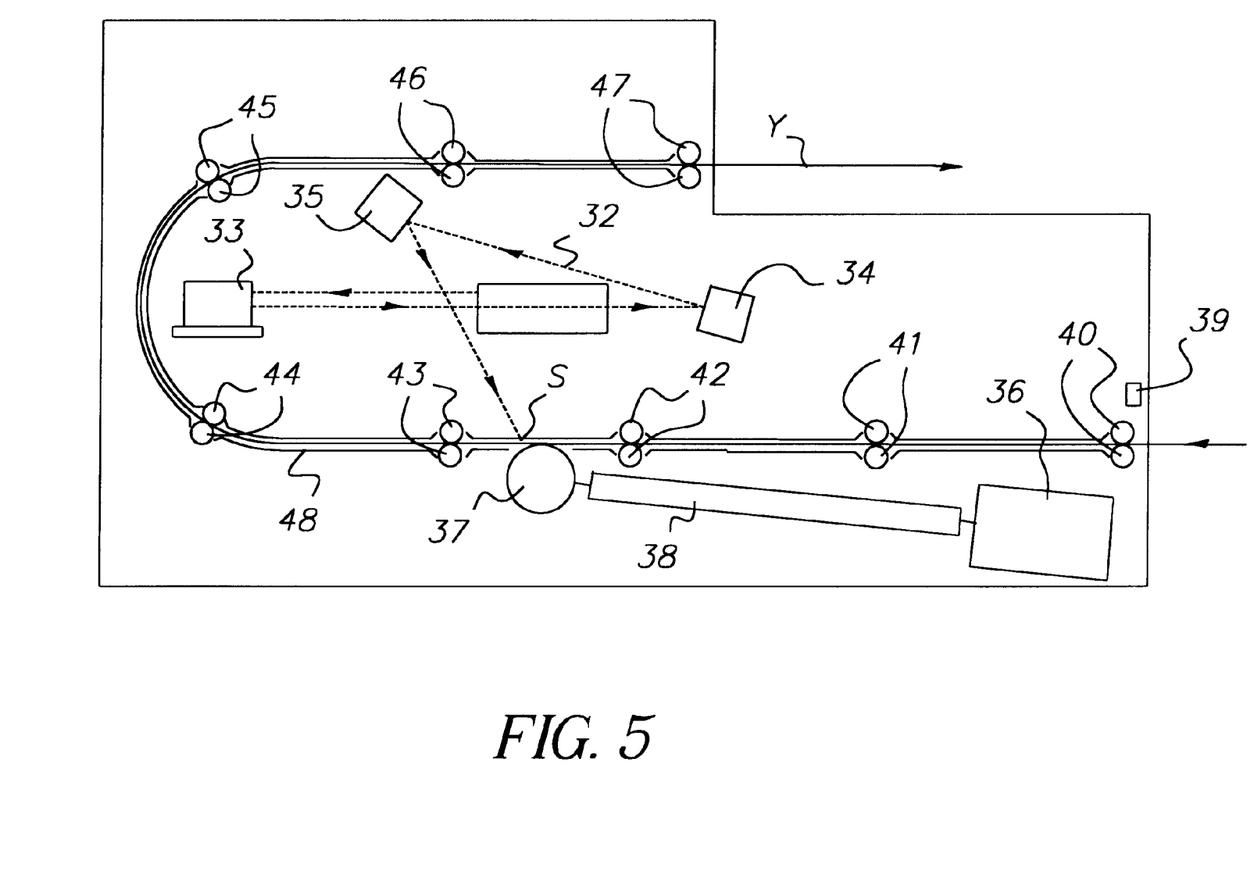
FIG. 5 is a schematic top view of the digitizer employed in the present invention.

With reference to FIGS. 1 to 4, the radiographic film digitizer 3 is vertically placed in relation to the right lateral side of the parallelepiped-shaped ground unit 4. The term "lateral side" means a side of the parallelepiped-shaped ground unit 4 parallel to the direction of the radiographic film within the parallelepiped-shaped ground unit 4. The radiographic film passes through the film digitizer along the direction Y indicated by the arrow in FIG. 3A. The digitizer is provided with a film receiver 26 placed in relation to the digitizer output 49. Any known digitizer apparatus can be used for the purpose of the present invention. FIG. 5 illustrates a preferred embodiment of the digitizer. The preferred radiographic film digitizer 3 comprises illuminating means 30 irradiating a linear light beam 32 to the radiographic film by means of a rotational polygonal mirror 33 and two reflective mirrors 34 and 35. The illuminating means can be a halogen lamp, a laser or any other point shaped light source known in the art. The rotational polygonal mirror 33 and two reflective mirrors 34 and 35 transform the point shaped light source in a planar light beam perpendicular to the radiographic film passing through the digitizer and parallel to its front edge. Rollers 40 to 47 and film guide 48 provide the radiographic film movement along the conveyance path indicated by the continuous line Y. A positioning infrared sensors 39 is put in relation to the first roller pair 40 for detecting the front edge of an entering film. A light deflector 37 is put in relation to the scanning line S for directing the light to a line sensor 36, which may include a CCD array, a photomultiplier, or the like. Both the light deflector 37 and the line sensor 36 are located on the side opposite to the illuminating means 30 with respect to the radiographic film such that the line sensor 36 receives the light beam 32 coming from the scanning line S. When the radiographic film is conveyed through the film digitizer 3 in the direction indicated by the arrow Y and reaches the position corresponding to the scanning line S, the light beam passes through the radiographic film. The light, which has passed through the radiographic film, is deflected by the deflector 37 and detected by the line sensor 36. Light guiding means 38 are preferably included between the deflector 37 and the line sensor 36 to guide and converge the light coming from the deflector 37 to the line sensor. Selfoc™ (a self-focusing lens array) microlenses are preferably used as light guiding means.

Figure 6:
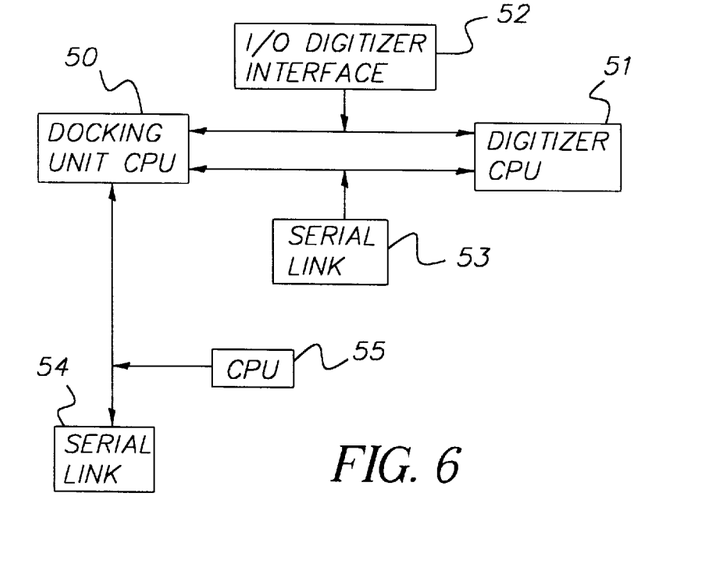
FIG. 6 is a schematic drawing illustrating the electronic connections between the docking unit and the digitizer employed in the present invention.

With reference to FIG. 6, the docking unit CPU 50 and the digitizer CPU 51 are directly connected via a dedicated digital interface named "I/O Digitizer Interface" 52 and a RS-232 serial link 53 (TX, RX, GND). The "I/O Digitizer Interface" is used to exchange synchronism signals and to carry out the film transport. The RS-232 serial link 53 is used to exchange status messages and film size ad type information. According to a preferred embodiment of the present invention, the radiographic film processing unit also comprises a CPU 55, similarly connected to the docking unit CPU 50 through a RS-232 serial link 54 (TX, RX, GND).

Figure 7:
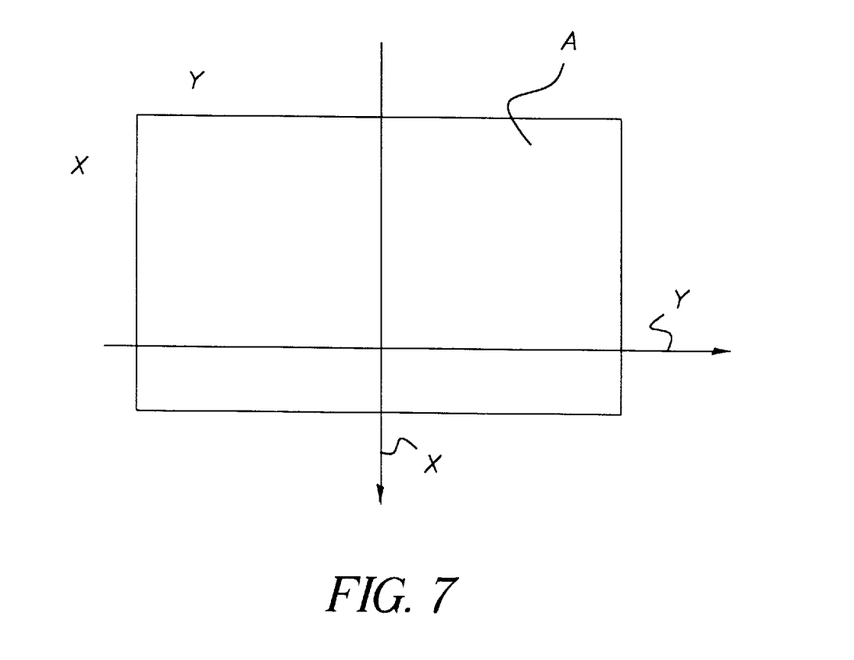
FIG. 7 is a schematic drawing illustrating the dimensions of a radiographic film.

With reference to FIG. 7, the radiographic film A is represented as a rectangular sheet having a widthwise edge (x) and a lengthwise edge (y). The arrows X and Y represent the two traveling directions of the radiographic film within the integrated radiographic film processor and digitizer of the present invention. The arrows X and Y present in all figures have the same meaning of the arrows of FIG. 7 and indicate the orientation of the radiographic film during the travel within the apparatus of the present invention.

The working of the apparatus of the present invention will be described below with reference to FIGS. 2 through 4.

An image-wised radiographic film is housed in a radiographic cassette. The cassette is put in the cassette-carrying unit 5, wherein the radiographic cassette is opened and the radiographic film is taken out of the cassette. The radiographic film, which has been taken out of the cassette, is fed into the parallelepiped-shaped ground unit 4. The radiographic film, which has been fed into and passed through the parallelepiped-shaped ground unit 4, is subjected to a developing process comprising developing, fixing, washing, and drying steps. The movement of the radiographic film through the ground unit 4 follows the direction X indicated in FIG. 7.

At the end of the drying step, the film is fed into the docking unit through the roller pair 8 or into the basket 21, depending upon the position of switch 20, again following the direction X. A radiographic film which was previously imagewise and developed can also be manually inserted into the docking unit 2 through the manual feeder roller 22. The manual feed operation is activated by an external command situated in the control panel 27, which rotates the roller 22 from the close position (with the groove 23 in the position indicated by the dotted line of FIG. 3B) to the open position (with the groove 23 in the position indicated by the continuous line of FIG. 3B). In this case, the radiographic film is inserted into the docking unit 2 through the groove 23 along the direction Y of FIG. 7.

The docking unit transports the film to the digitizer as described below using the synchronism defined in the I/O Digitizer Interface 52. The docking unit CPU 50 always sends film data to digitizer CPU via RS232 serial link 53. The digitizer sets the scanner according to the film data received or alternatively utilizes the scanner default parameters (35×43 cm, standard mode).

At the start of the loading procedure, the rack 9 is open and the front and back rollers 12 and 13 are spaced about 3 mm. When a radiographic film is coming out from the roller pair 8, the gravity force acting on the film during the passage through the roller pair 8 and the switch 20 promote the falling of the film into the rack 9 between front and back rollers 12 and 13. The radiographic film falls into the rack with its lengthwise edge (y) contacting the bottom plane 10 in a substantially vertical position. Once the radiographic film is in the rack 9, the positioning sensors 17 and 18 first provide a control to the correct positioning of the film on the bottom plane 10 and second send a signal to a pair of solenoids (not shown) which closes the rack 9 by moving the back side 11b towards the front side 11a, thus bringing the front and back rollers 12 and 13 into contact with the radiographic film and keeping it in a fixed vertical position. Once the rack is closed, the front and back rollers 12 and 13, and 14 and 15 are actuated by a DC motor (not shown) through a conventional system of gears and belt, and move the radiographic film to the digitizer. From this time onwards, the radiographic film is traveling along the direction Y indicated in FIG. 7. When a radiographic film is manually inserted through the manual feeder roller 22, the closure of the rack and the start of the rollers is manually actuated by an external command situated in the control panel 27.

The radiographic film passes through the set of sensors 19 which are able to detect the width edge (x) of the radiographic film. At the same time, the set of sensors 19 provides a start signal to the photobarrier tachometer sensor 24 reading the holes of the tachometer wheel 25. The tachometer wheel contains a predetermined number of holes (e.g., 100) so that the distance between each hole corresponds to a predetermined film travel (e.g., 0.8 mm). During the path between the rack 9 and the input of the digitizer 3, the film travels at a constant speed of from 12 to 18 cm per second, preferably at about 15 cm per second. As soon as the end of film overcomes the set of sensors 19, they send an end signal to the tachometer sensor, which concludes the film length (y) measurement. At this point, the film format (width x and length y) is known by the docking unit CPU 50 and a corresponding signal is sent to the digitizer CPU 51, which set the digitizer for receiving and scanning the film. When the radiographic film processing unit comprises means for the identification of the radiographic film type and size as soon as the radiographic film is taken out from the radiographic cassette in the cassette-carrying unit 5, the film data are sent directly to the docking unit CPU 50 and forwarded to the digitizer CPU 51 as soon as the radiographic film falls within the rack 9. In this case, the radiographic film processing unit is provided with a Central Processing Unit (CPU) 55 which is connected to the docking unit CPU 50 through the RS232 serial link 54, similarly to the above description.

In order to feed the digitizer, the motor has to decrease the speed to obtain a film travel speed ranging from 10 to 11 cm/s. The docking unit CPU 50 sets the start of the decreasing speed ramp after the tachometer sensor 24 has counted from 150 to 250 holes, preferably about 220 holes of the tachometer wheel, corresponding to about 18 cm of film travel. The total speed decreasing time is set equal to 1 second.

As soon as the film reaches the roller pair 40 at the input of the digitizer, the sensor 39 provides a signal to open the rack 9 so that from this time onward the film is moved by the transporting system of the digitizer 3. When the film has a length (y) equal to or higher than 40 cm, the opening of the rack 9 is delayed until the end edge of the film passes beyond the set of sensors 19. This delay is needed because the length of the transporting path from the output of the rack 9 to the input of the digitizer 3 is about 40 cm and allows the film length measurement to continue until the longer size film has passed beyond the set of sensors 19. Alternatively, the film length can be detected by the plurality of horizontal sensors located in relation to the bottom plane 10. In this case, as well as in case the film type and size data were already received from the radiographic film processing unit CPU 54 described above, the rack 9 opening delay is of course not necessary.

With reference to FIG. 5, the radiographic film is transported within the digitizer 3 by means of rollers 40 to 47 and film guide 48. When the front edge (x) of the radiographic film reaches the position corresponding to the scanning line S, the intensity of the light passing through the radiographic film is modified in accordance with the radiographic image recorded on the radiographic film. The light passed through the radiographic film is deflected by the light deflector 37 and detected by the line sensor 36. In this manner, an analog image signal representing the image information recorded on a single line on the radiographic film is obtained. By repeating the detection of the light while the radiographic film is being conveyed in the direction indicated by the arrow Y, an analog image signal is obtained which represents the whole radiographic image recorded on the radiographic film. The analog image signal is then amplified by an amplifier and converted by an A/D converter into a digital image signal. The digital image signal can be stored on any known digital storage means, such as, for example, an optical disk, and eventually displayed on a video monitor or registered on hardcopy.

The above described working operations are executed and synchronized by means of the docking unit Central Processing Unit (CPU) 50 and the digitizer Central Processing Unit (CPU) 51, which exchange data relating to, for example, film size and type, position of the film within the apparatus of the present invention, film jamming, type of film feeding (automatic or manual), and the like. The exchange of data between the docking unit CPU 50 and the digitizer CPU 51 is made by means of the above described dedicated digital interface named "I/O Digitizer Interface" 52 and a RS-232 serial link 53 (TX, RX, GND). The "I/O Digitizer Interface" is a digital link provided with four digital signals: two of them come out from the docking unit CPU 50 and the other two signals come out from the digitizer CPU 51. The status of the signals is defined via reed relay contacts or static relays. The CPU 50 of the docking unit 2 controls the contacts of two reed relays, namely, one normally open contact (NO) of the first relay, and one normally closed contact (NC) of the second relay. Static relays are mounted on the CPU 51 of the digitizer 3. Both relays are NO ones. The contacts go directly to the interface connector mounted on the digitizer CPU 51. The reed relays separate the two boards from the electrical point of view. Both the CPUs use two input lines (filtered) to read the status of the relays. The filters on the digitizer CPU 51 have to take into account the time response of the reed relays. Accordingly each CPU has two output signals (corresponding to the status of the relays) and two input signals (reading the status of the relays), as described, for example, in the following Tables 1 and 2. Table 1 relates to the docking unit CPU 50 and Table 2 relates to the digitizer CPU 51.

TABLE 1

| START | NO Reed Relay # 1 | Output |
|---|---|---|
| TEST | NC Reed Relay # 2 | Output |
| Ready | Reads READY of CPU 51 | Input |
| Film | Reads FILM of CPU 51 | Input |

TABLE 2

| READY | NO Static Relay # 1 | Output |
|---|---|---|
| FILM | NO Static Relay # 2 | Output |
| Start | Reads START of CPU 50 | Input |
| Test | Reads TEST of CPU 50 | Input |

The position of the relays (open-close) of the docking unit CPU 50 is read by the digitizer CPU 51 and vice-versa and each position conveys an information from a CPU to the other CPU. The following Table 3 summarizes the status of the relays and their synchronism to run a film transport cycle. The letters A through G represent various steps of the film transport cycle.

TABLE 3

|  | A | B | C | D | E | F | G |
|---|---|---|---|---|---|---|---|
| START | Open | Close | Close | Close | Close | Open | Open |
| TEST | Open | Open | Open | Open | Open | Open | Open |
| READY | Close | Close | Close | Open | Open | Open | Close |
| FILM | Close | Close | Open | Open | Close | Close | Close |

The meaning of each position combination A through G is summarized in the following Table 4.

TABLE 4

A   The digitizer is ready with no film in its entry area. The docking unit is empty and ready to accept a film.
B   A film has been fed into the docking unit. The film is in position TABLE 4-continued ready to move. The docking unit closes the rack and starts the film transport. The docking unit and digitizer start the proper motor.
C  The film enters the digitizer. The docking unit opens the rack.
D  The digitizer changes to not read and does not accept any further film.
E  The film has completely traveled the first couple of rollers in the digitizer. The entry area is again free but the digitizer is still not ready to accept another film. The digitizer transports the film to the scanning zone.
F  The docking unit stops the motor.
G  The digitizer returns ready. Another film can be sent to the digitizer. The digitizer stops the motor. The cycle can restart.

Although the present invention has been described in detail with reference to a preferred embodiment, those skilled in the art will recognize that changes may be made in form and detail without departing from the spirit and scope of the invention.

What is claimed is:

1. An apparatus for developing and digitizing an image-wise exposed silver halide radiographic film processing unit having an output, wherein said processing unit develops said image-wise exposed silver halide radiographic film to create a visible image on said radiographic film;
   a radiographic film digitizer having an input, wherein said radiographic film digitizer is vertically positioned in relation to a lateral side of said radiographic film processing unit, and photoelectrically reads said visible image on said radiographic film and;
   an integrated docking unit having a connecting means which connects said radiographic film processing unit to said film digitizer and transports said radiographic film from said output of said radiographic film processing unit to said radiographic film digitizer;
   wherein said connecting means comprise:
   receiving means for receiving said radiographic film from said output of said film processing unit in a vertical position,
   keeping means for keeping said radiographic film in a vertical position on the lengthwise edge (y) of said radiographic film, and
   transporting means for transporting said radiographic film from said receiving means to said input of said radiographic film digitizer.

2. The integrated apparatus according to claim 1 wherein said receiving means comprises a rack having a bottom plane and two front and back sides.

3. The integrated apparatus according to claim 2 wherein said keeping and transporting means comprise a plurality of front and back vertical rollers.

4. The apparatus according to claim 3 wherein at least one set of said plurality of front and back vertical rollers are engaged with upper and lower edge of said front and back sides.

5. The apparatus according to claim 2, wherein said front side is fixed and said back side is movable.

6. The apparatus according to claim 2, wherein at least two positioning infrared sensors are horizontally positioned in relation to said bottom plane.

7. The apparatus according to claim 3, wherein a plurality of vertically-disposed infrared sensors are placed laterally to said rack in relation to a first set of vertical rollers.

8. The apparatus according to claim 1, wherein a roller provided with a groove is provided laterally to said docking unit; and wherein said roller is rotatable to a position wherein said groove is positioned to allow a previously developed radiographic film to be manually inserted into said docking unit.

9. The apparatus according to claim 3, wherein at least one of said plurality of front and back vertical rollers is connected to and rotating with a tachometer wheel having a predetermined number of holes.

10. The apparatus according to claim 9, wherein a photobarrier tachometer sensor is placed in relation to said tachometer wheel.

11. The apparatus according to claim 1, wherein said docking unit comprises a basket for receiving said image-wise exposed silver halide radiographic film after being developed in said radiographic film processing unit.

12. The apparatus according to claim 1, wherein said docking unit comprises a switch for deviating the path of said radiographic film exiting from said radiographic film processing unit either to said receiving means or to said basket.

13. The apparatus according to claim 1, wherein said docking unit comprises a docking unit CPU and said digitizer comprises a digitizer CPU.

14. The apparatus according to claim 13, wherein said docking unit CPU and said digitizer CPU are directly connected through a dedicated digital interface and a RS-232 serial link.

15. The apparatus according to claim 14, wherein said radiographic film processing unit comprises a CPU directly connected through a RS-232 serial link to said docking unit CPU.

16. A method for the automatic processing and digitizing of an image-wise exposed radiographic film comprising the step of:
   processing said radiographic film in an automatic radiographic film processing unit, said processing comprising the steps of developing, fixing, washing and drying, and
   feeding along a direction (X) said processed radiographic film to a docking unit comprising means for keeping and transporting said processed radiographic film in a position substantially vertical,
   transporting said processed radiographic film into a radiographic film digitizer, along a direction (Y) substantially orthogonal to said feeding direction (X) and
   digitizing said processed radiographic film.

* * * * *